Feb. 16, 1971   J. M. JACOBS, JR., ET AL   3,562,939
VIEWER
Filed July 18, 1968   2 Sheets-Sheet 1
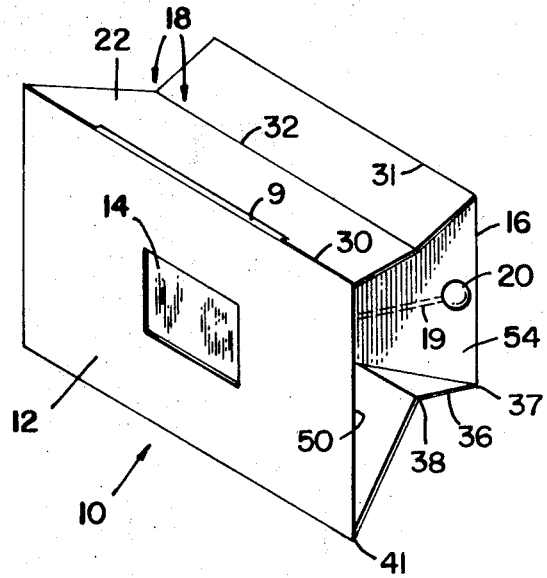
FIG_1
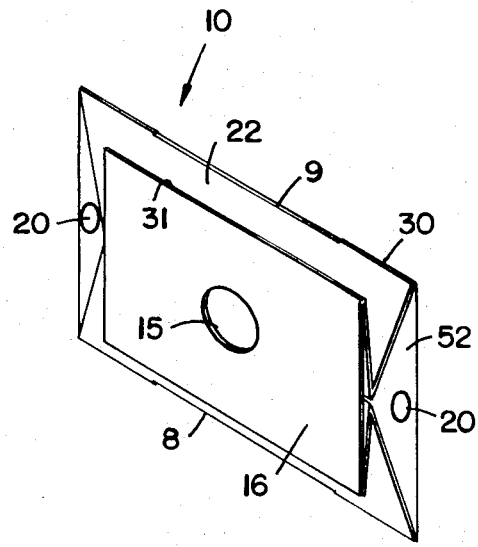
FIG_2
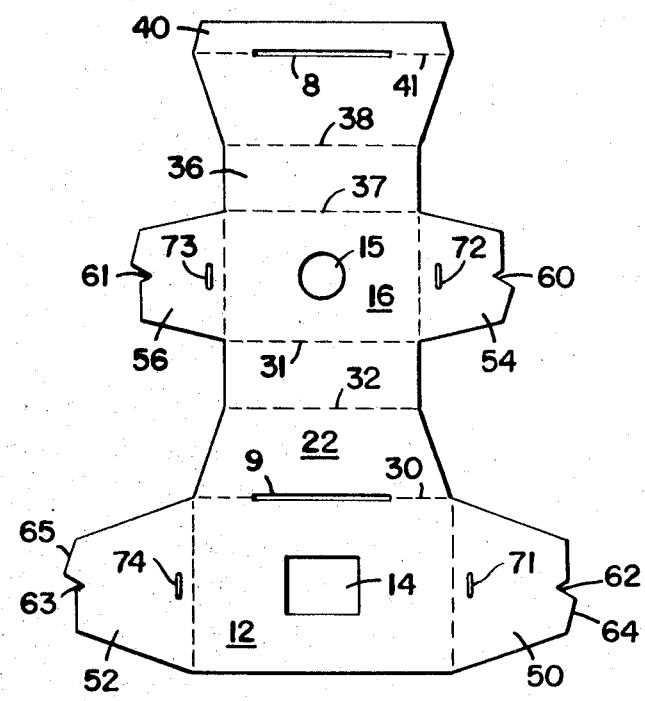
FIG_3
INVENTORS
JUSTIN M. JACOBS, JR.
BY KELLOGG D. FLEMING
Edward J. Keeling
ATTORNEY

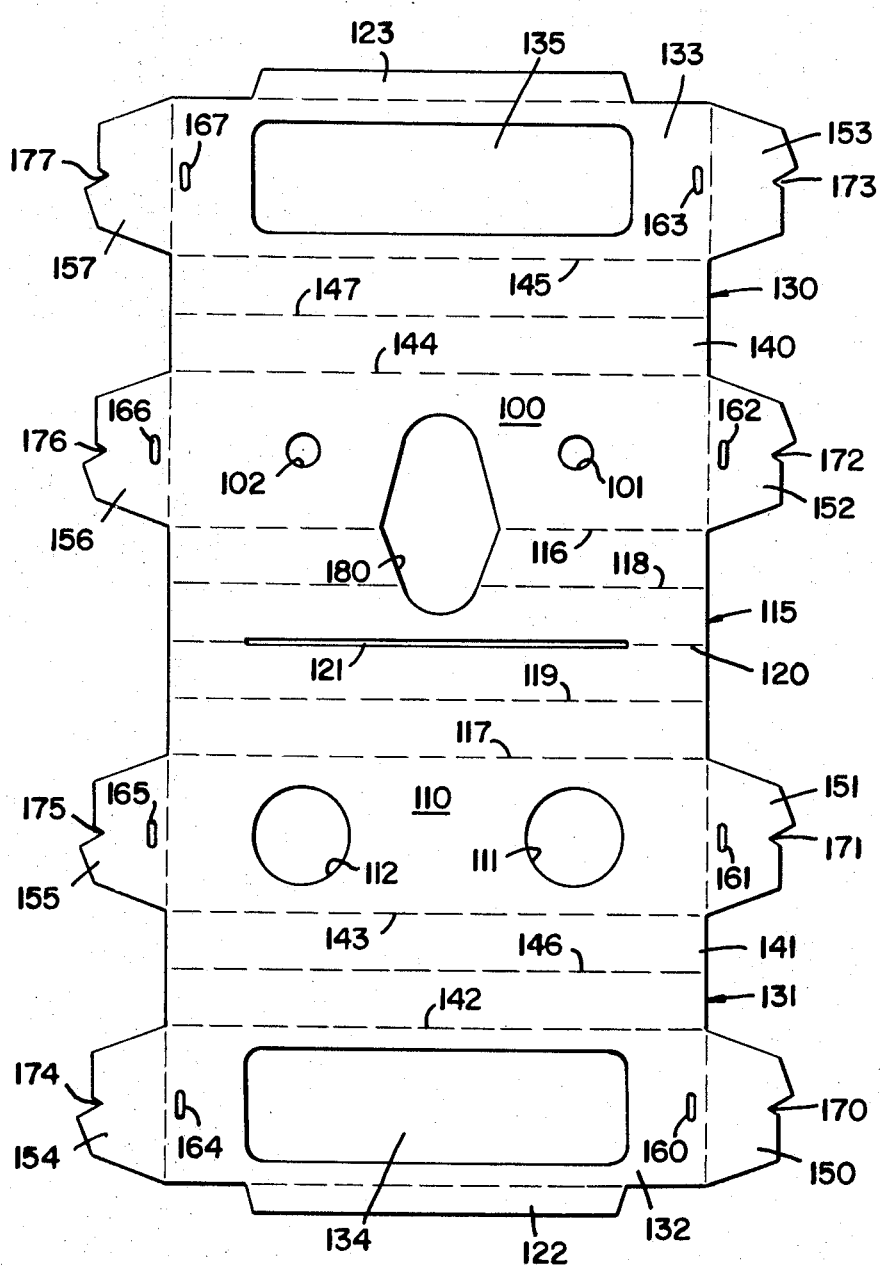
FIG_4

United States Patent Office 3,562,939
Patented Feb. 16, 1971

3,562,939
VIEWER
Justin M. Jacobs, Jr., and Kellogg D. Fleming, San Francisco, Calif., assignors, by direct and mesne assignments, to Justin M. Jacobs, Jr., San Francisco, Calif.
Filed July 18, 1968, Ser. No. 745,737
Int. Cl. G09f 11/30
U.S. Cl. 40—63                                    12 Claims

ABSTRACT OF THE DISCLOSURE

A collapsible viewer, the view chamber of which is substantially made from a single piece of material. The viewer has resilient means to selectively assist in maintaining the viewer extended in operating position or collapsed in storage position.

This invention relates to a collapsible viewer and more particularly this invention relates to a collapsible viewer having a view chamber the substantial portion of which can be formed from a single piece of material and which has resilient means to selectively maintain the viewer extended in operating position or collapsed in position suitable for storage or mailing. The viewer of the present invention is useful in viewing transparent slides and the like. It is also useful in the form of collapsible binoculars. Further, it is contemplated that the viewer may be used to form a collapsible bellows for a simple camera.

Co-pending application Ser. No. 604,249 filed Dec. 23, 1966 by one of the present applicants discloses and claims a collapsible slide viewer. This collapsible viewer utilizes a compression spring and bellows means formed thereabout and connected to a base plate and a viewing plate to form a collapsible view chamber. While the collapsible viewer of the earlier application has been found to be an attractive, easily operated viewer which maintains its form both in the extended and retracted positions, it is relatively expensive to manufacture. Therefore, there is still need for a collapsible viewer which can be substantially formed from a single piece of material and which is inexpensive to make and which contains resilient means to selectively maintain the viewer in spaced apart operating position or in folded storage position.

In a board aspect my invention provides a collapsible viewer which includes a pair of spaced apart base sections, each of said sections having an opening therein. The base sections define the ends of a view chamber. The base sections are joined by a continuous connecting section of the same material unitarily formed with the base sections. The continuous connecting section defines one collapsible wall of the six walled view chamber. Parallel inward folds are provided at the intersection of each base section and said continuous connecting section, said inward folds tending to bring said openings into registering alignment for viewing therethrough. An outward fold is provided in said connecting section between said base sections, said outward fold being formed parallel to said parallel inward folds in a manner which tends to fold the intermediate portion of said continuous connecting section between the said base sections. Discontinuous connecting section means are unitarily formed with and extends from one of or both of said base sections. The discontinuous connecting section means forms the collapsible wall of the view chamber opposite the collapsible wall formed by the continuous connecting section. An inward fold is formed at the intersection of the base section and said discontinuous connecting section means. The inward fold is parallel to the parallel inward folds of the continuous connecting section and tends to bring the free end of said disconnected connecting section means in contact with the free end of the other of said base sections or with the portion of the disconnected connecting section means extending therefrom. An outward fold is formed in said disconnected connecting section means adjacent the outward fold in said continuous connecting section, said outward fold being parallel to said inward fold, thus causing the intermediate portion of the disconnected connecting section to fold between the base sections. The free end of the disconnected connecting section means is attached to the other of said base sections or to the portion of the disconnected connecting section means extending therefrom by suitable means such as a tab member formed either on the free end of the other of said base sections or on the free end of the disconnected connecting section. If desired, the tab member may also take the form of a cooperating disconnected connecting section when a multiple view chamber is required. The two base sections and the two connecting sections cooperate to form the ends and two opposing walls of the view chamber. The remaining two opposing side walls are provided by right and left side tabs which extend from each of the said base sections at substantially right angles to the two connecting sections. The side tabs of a given base section are substantially mirror images of each other and are individually shorter than the connecting section. Inward folds are provided between the side tabs and the base sections. The right side tabs and the left side tabs of the respective base sections are long enough to overlap when folded and cooperate to form collapsible third and fourth walls between the base sections to complete the view chamber. Thus when the base sections are extended, the side walls cooperate with the base sections to define a view chamber which inhibits light from entering into the space defined by the elements. When the base sections are pushed together the side tabs along with the connecting sections fold flat between the base sections. Extendable resilient means are connected across the side tabs to assist in maintaining the viewer selectively in extended operating position or in collapsed storage position. The resilient means are in tension across the side tabs both when the side tabs are folded between the base plates and when the side tabs are extended in operating position. Suitable lens means or a suitable combination of lens means and view means are provided in the said openings according to the desired function of the apparatus of the present invention.

In another aspect the present invention provides apparatus for viewing comprising a first base section having a light receiving view opening formed therein. Optical means are formed in said base section adjacent said view opening for assisting in transmitting light through said view opening. A second base section is provided with a view receiving opening. Collapsible bellows means are connected between said first base section and said second base section for forming a viewing chamber. Extendible resilient means are connected across said bellows means between said base plate and said viewing plate. The resilient means are extended in tension to prevent said first base section and said second base section from moving beyond a pre-determined spaced apart relationship. The resilient means also are extended in tension when said bellows means are collapsed to assist in maintaining said first base section and said second base section in folded together relationship.

In stll another aspect, the present invention provides a viewing apparatus which is substantially formed from a single piece of material and comprises a first base section having a light receiving opening formed therein, a second base section arranged in parallel spaced apart relationship with said first base section, inwardly foldble side wall sections connecting said first base section and said second base section on two opposite sides, tab sections extending from the free sides of said base sections cooperating to close the end spaces between said first base section and said second base section, said respective tab sections being in contact when said first base section and said second base section are arranged in predetermined spaced apart operating relationship and said respective tab sections being in wardly foldable when said first base section and said second base section are collapsed in closely spaced relationship, the said wall sections and the said tab sections cooperating to form a bellows means, and resilient means connected interiorly of said bellows means and extending across said tab sections to assist in holding said first base section and said second base section in spaced apart relationship, said resilient means being extendable to permit said first base section and said second base section to be collapsed in closely spaced apart relationship.

It is a particular object of the present invention to provide a viewing apparatus useful in a variety of viewing operations and having a collapsible view chamber which can be substantially formed from a single piece of material and which has resilient means to form a collapsible viewing means which is stable in both the folded position and the extended operating position. Further objects and advantages of present invention will become apparent from the following detailed description read in light of the accompanying drawings which are made a part of this specification and in which:

FIG. 1 is a perspective view illustrating the preferred embodiment of apparatus assembled in accordance with the present invention in extended operating position;

FIG. 2 is a perspective view illustrating the preferred embodiment of apparatus assembled in accordance with the present invention in collapsed position;

FIG. 3 is a layout view utilizing dotted lines to show folds of the preferred apparatus of the present invention; and FIG. 4 is a layout view utilizing dotted lines to show folds of an alternative arrangement of apparatus of the present invention.

Refer now to the drawings and to FIGS. 1 and 2 in particular, where the preferred embodiment of apparatus assembled in accordance with the present invention is illustrated in perspective. The viewer of the present invention is generally indicated by the numeral 10 in both figures. The bellows of the viewer are extended in operating position in FIG. 1 and the bellows are collapsed in folded position in FIG. 2. The apparatus, which may be for example a slide viewer or collapsible binoculars, has a first base section 12 having a light receiving opening 14 formed therein. The first base section 12 is connected in substantially parallel spaced apart relationship with a second base section 16 by foldable bellows means generally indicated by the numeral 18. The foldable bellows 18 acts to maintain opening 14 in base section 12 in view registering relationship with opening 15 in base section 16. The foldable bellows 18 is formed by four inwardly folding walls. Two of these walls 22 and 36 are continuous between the base sections. Each wall has a fold 32 and 38 which allows the walls to be folded in between the base sections as the bellows of the viewer are collapsed. The other two walls are formed by cooperating tabs extending from each base section. For example, tab 50 extending from base section 12 cooperatively engages with tab 54 extending from base section 16 to form a collapsible wall. Thus the tabs fold inwardly between base sections 12 and 16 as the bellows of the viewer are collapsed. Resilient means 19 are placed across the inside of tabs 50 and 54 to assist in maintaining the bellows means in a desired position. Thus the resilient means 19 is connected on the inside of the base sections 12 and 16 near the folds of the tabs 50 and 54 and is maintained in tension which tends to force the tabs 50 and 54 in an outward direction and which also assists in limiting the distance that base sections 12 and 16 can separate. Button means 20 holds the resilient means 19 in position.

FIG. 3 is a pattern type layout view showing in layout form the general pattern of a viewer in accordance with the invention. This blank is cut from asingle sheet of stock material and when folded as indicated forms the viewer shown in FIGS. 1 and 2. The relative sizes of the base sections 12 and 16 as well as the tabs 50, 52 and 56 and the connecting sections 22 and 36 are only shown as by example. Different sizes of these elements will give different sized and shaped viewers. Also it is quit evident that a pair of openings may be made in each base section to allow for using the apparatus with both eyes.

Again referring to FIG. 3, a pair of spaced apart base sections, which for ease of description will be nominated as base section 12 and viewing section 16, are provided respectively with a light receiving opening 14 and a viewing opening 15. The base setcions 12 and 16 form the end of a view chamber. Continuous connecting section 22 extends between the base section 12 and the viewing section 16. The continuous connecting section 22 is provided with parallel inward folds indicated as 30 and 31 at the intersection of the base sections 12 and 16 with the continuous section 22. An outward fold 32 is formed in the connecting section 22 intermediate the inward folds 30 and 31. A discontinuous connecting section 36 extends in a unitary manner from either or both of the base sections. An inward fold 37 is formed between the base section and the discontinuous connecting section 36. The inward fold 37 is formed parallel to the inward folds 30 and 31 of the continuous connecting section 22. In a similar manner the discontinuous connecting section 36 is provided with an outward fold 38 directly opposite outward fold 32 of the continuous connecting section 22. The free end of the discontinuous connecting section 36 is provided with means for attaching it to base section 12. For example, a tab section 40 having an inward fold 41 at an appropriate position may be utilized to connect the second connecting member to the base section 12 as for example by gluing it to the base section 12. Alternatively the tab 40 could be inserted into a suitable slot formed in base section 12. It is obvious, of course, that the discontinuous connecting section 26 and the tab 40 may extend from either of the base sections 12 or 16. It is also clear that discontinuous connecting section 26 may extend from both base sections 12 and 16 and be connected together in a suitable manner intermediate the base sections.

When the viewer of the present invention is cut from a piece of material, and the above-noted folds are provided, the viewer can be arranged by connecting flap 40 to base section 12 to form a chamber having two open sides. Tabs 50 and 52 on base section 14 and tabs 54 and 56 on viewing section 16 are used to close the open sides to provide a view chamber defined by a foldable bellows means. Thus tabs 50 and 52 which extend from base section 12 are cut as mirror images of each other in the general shape illustrated. Tabs 54 and 56 extending from viewing section 16 are cut in a similar configuration. The opposing tabs, such as for example tab 50 on the base section 12 and tab 54 on the viewing section 16, cooperate in sliding relationship with one another to close a side of the above described open view chamber. The ends of the tabs are formed to meet adjacent the outward folds 32 and 38 when the viewer is in operating position. When the viewer is collapsed the connecting sections by virtue of the suitably arranged folds and the flaps all fold in between the base sections 12 and 16 to result in a flat compact device. When the viewer is used to look at film strips, suitable slots 8 and 9 may be cut along folds 30 and 41 to accommodate the film strip.

Resilient means are extended across the inside of the tabs 50 and 54 and 52 and 56 respectively to assist in keeping the said tabs in position and to assist in maintaining the base sections in the desired spaced apart relationship. Notches are formed on the ends of the tabs to serve as a guide for the resilient means to give stability to the bellows. For example, notches 60 and 61 are formed in the tabs 54 and 56 of the viewing section 16. Notches 62 and 63 are formed in the tabs 52 and 50 of base section 12. The cooperating notches, for example 62 and 63 of base section 12 and the cooperating tip sections 64 and 65 interact to stabilize the bellows. The resilient means, for example a rubber band or an elastic member, is connected across the tabs and is held in the notch formed by the cooperating tab members. Thus resilient means is connected to tab 50 at hole 71 and extends across the notches 62 and 60 of tabs 50 and 54 to a similar hole 72 in tab 54. The resilient means is fastened on the inside of the bellows and prevents undesirable collapse or over-extension of the bellows. Various methods for attaching the extendable resilient means include fastening them to the tabs themselves through suitable holes such as described above. The resilient means may alternatively be connected to the base sections near fold between the tab and the base section. A general guide useful in the manner of selecting and connecting the resilient means is that the resilient means should have an elasticity of a thin rubber band and that the band, when connected, should be stretched about 5% to 10% of its length when the bellows are folded or expanded. The band should be so arranged that it stretches no more than about 20% of its length during opening or folding of the bellows.

Various stock material may be used in forming the apparatus. Paper of suitable weight and finish is preferred for use in this respect. A paper material having a paper weight of between 10 point and 15 point is most desirable. Paper having a degree of stiffness and weight included within the range of from 5 point to 20 point may be used in the invention. It is quite desirable that the paper have a smooth finish so that the bellows can easily be folded and opened without undue friction or sticking.

As indicated above, the bellows and thus the viewer can be assembled in almost any size and proportion. The distance between the base sections 12 and 16 is usually governed by the focal length of the lenses used. Of course the relative sizes of the base sections may also vary considerably. That is, they may be the same size in which case the tabs are all symmetrical or they may differ in size as much or more than the arrangement in FIG. 3. The lower portion of beveled edges of the tabs frictionally interact with the inner folded portion of the connecting sections when the bellows is in operating position. When the viewer is compressed or folded the tabs slide down the inner walls of the connecting sections as they fold and lie flat between the base sections. There are, therefore, some general relationships that must be followed in sizing the various elements so as to enable construction of a collapsible bellows which can be easily opened and closed and which is stable in both positions.

The relationships are found in the range of inner angles found suitable between a connecting section and a base section when the bellows is extended in operating position as in FIG. 1. This would be for example, the interior angle formed between connection section 36 and base section 16 and would also correspond to similar angles. This angle is preferably between about 50°–70°. Angles of greater than 75°–80° result in unstable bellows as do angles of less than 30°–35°. Suitable bellows means can be formed with angles between these upper and lower extremes. There is also a relationship of inner angles between a tab and its corresponding base section. For example these angles are the type of angle found between tab 54 and base section 16 when the bellows are in operating position. Angles between about 30° to 45° are preferred. If the said angle exceeds about 60° then it is difficult to close the bellows since the tab will not easily slide down the inner folded portion of the adjacent connecting sections. If the angle is less than 20° then the bellows is not stable in the open position. As indicated, these angle relationships give a general guide to the various size relationships that the elements of the bellows may take.

It is apparent that various arrangements of optical elements may be made at openings 14 and 15. For example a slide holding means can be fastened adjacent opening 14 and a suitable lens for eye viewing fastened at opening 15. If desired a lens may be positioned in both openings to give a telescopic effect or a binocular effect if plural openings are used. It is also contemplated that a simple lens and shutter arrangement be attached adjacent opening 14 and a suitable film be located on base section 16 to form a simple camera.

An alternative arrangement of apparatus in accordance with the present invention is shown in FIG. 4. This arrangement is particularly useful when the collapsible bellows is used as a hand held binocular or the like which requires a relatively longer focal length while retaining compact dimensions. FIG. 4 illustrates the blank for forming the apparatus by folding where indicated and assembling as herein described. Essentially this embodiment provides for a pair of adjacent communicating view chambers which are assembled from a single piece of stock material. A particular advantage of the apparatus as illustrated is that when assembled one side of the material forms the outside of the chamber while the other side of the material forms the inside. Thus stock material having an expensive finish for the outside and a less expensive finish for inside may be used.

This embodiment of the invention provides a collapsible bellows for binoculars or the like and includes a pair of spaced apart base sections 100 and 110, each of said sections having at least one opening 101 and 111 therein. For use as binoculars, of course, two openings 101 and 102 and 111 and 112 are provided in each base section. The base sections define the ends of the view chamber. The base sections 100 and 110 are joined by a continuous connecting section 115 of the same material unitarily formed with the base sections. The continuous connecting section 115 serves as one wall of the four collapsible walls of the view chamber. Parallel inward folds 116 and 117 are provided at the intersection of each base section 100 and 110 and said continuous connecting section, said inward folds tending to bring said openings 101 and 111 into registering alignment for viewing therethrough. A pair of outward folds 118 and 119 are provided in said connecting section 15 between said base sections, said outward folds being formed parallel to said inward folds 116 and 117 in a manner which tends to fold the intermediate portion of said continuous connecting section between the said base sections. An inward fold 120 having a slot 121 formed over a portion of its length is provided intermediate the pair of outward folds 118 and 119. The slot 121 is sized to receive tabs 122 and 123. A pair of discontinuous connecting sections 130 and 131 each of which is approximately the same length as the said continuous connecting sections are unitarily formed with and extend from the free ends of said each base section.

The discontinuous connecting sections indicated generally as 130 and 131 each comprise an intermediate base section 132 and 133 and an intermediate connecting section 140 and 141. Each of the intermediate connecting sections 140 and 141 has an intermediate base section 132 and 133 attached thereto. Each intermediate base section 132 and 133 has a view opening 134 and 135 which permits light registering through the intermediate sections 132 and 133 when they are connected in back to back relationship in assembled position. Parallel inward folds 142 and 143 and 144 and 145 are provided at the intersection of each intermediate base section 132 and 133 and each intermediate connecting section 141 and 140 respectively and each intermediate connecting section 141 and 140 and its respective base section 100 and 110. An outward fold 146 and 147 is provided intermediate each intermediate connecting section 141 and 140. Thus when a blank is cut and folded as described and tabs 122 and 123 placed in slot 121 a partially defined collapsible view chamber enclosed on four sides results. Base sections 100 and 110 form the ends of the view chamber; the continuous connecting section 115 forms one of the collapsible walls and the two intermediate connecting sections 140 and 141 cooperate to form the second collapsible wall. The intermediate base sections 132 and 133 are held back to back intermediate the view chamber by means of tabs 122 and 123 and preferably an adhesive applied adjacent folds 142 and 147. All that now remains is to foldably close the side walls to complete the view chamber. The side walls are provided by right side tabs 150–153 and left side tabs 154–157 which extend from each of the said base sections 100 and 110 and each of the intermediate base sections 132 and 133 at substantially right angles to the connecting sections. As described in discussing the preferred embodiment the side tabs of a given base section are substantially mirror images of each other and are individually shorter than the connecting section. Inward folds are provided between the side tabs and the base sections. The right side tabs and the left side tabs of the respective base sections are long enough to overlap when folded and cooperate to form collapsible side walls between the base sections to complete the view chamber. Thus when the base sections are extended, the side walls cooperate with the base sections to define a view chamber which inhibits light from entering into the space defined by the elements. When the base sections are pushed together the side tabs along with the connecting sections fold flat between the base sections.

Extendable resilient means (not shown) are connected across the side tabs to assist in maintaining the view selectively in extended operating position or in collapsed storage position. Suitable perforations 160–163; 164–167 are provided in the side tabs and base sections to accommodate the resiliant means. A single rubber or elastic band or the like may form the resilient means for the right side and a similar band may be used for the left side. Thus two resilient bands are all that are needed for this embodiment. For example a rubber band having a suitable stop means on its rear portion may be threaded in through hole 165 of tab 155; through adjoining holes 164 and 167 of tabs 154 and 157; and out through hole 166 in tab 156. The forward end of the rubber band is provided with a stop means to hold it in position. The resilient means are in tension across the side tabs both when the side tabs are folded between the base plates and when the side tabs are etxended in operating position. Notches 170–173 and 174–177 are provided in the tabs as discussed above to stabilize the resilient means. Suitable lens means or a suitable combination of lens means and view means are provided in the openings to complete the apparatus of the present invention. A cut out portion 180 provides a suitable hole for the nose when the viewer is used as binoculars or a stereo viewer.

Embodiments other than those described above will be apparent to one skilled in the art. Although only a few specific embodiments of apparatus have been described, the invention is not meant to be so limited but rather the invention is meant to include all embodiments coming within the scope of the appended claims.

We claim:

1. Apparatus comprising a base section having a light opening formed therein, a viewing section, collapsible bellows means connected between said base section and said viewing section to form a viewing chamber, said bellows means including cooperating inwardly folding tab means extending from said base section and from said viewing section and extendable resilient means connected across the cooperating tab means of said bellows means to assist in maintaining said tabs in cooperating position, said resilient means acting to restrain said base section and sad viewing section from moving beyond a predetermined, spaced apart relationship.

2. A collapsible viewer comprising a pair of spaced apart base sections, each of said sections having an opening therein, a continuous connecting section of the same material unitarily formed with the base sections and connecting said base sections, parallel inward folds at the intersection of each base section and said continuous connecting section, said inward folds tending to bring said openings into alignment for viewing therethrough, an outward fold in said continuous connecting section between said base sections, said outward fold being formed parallel to said inward folds in a manner which tends to fold the interemdiate portion of said continuous connecting section between the said base sections, a discontinuous connecting section means of approximately the same length as the said continuous connecting section unitarily formed with and extending from one of said base sections, an inward fold formed at the intersection of said one of said base sections and said discontinuous connecting section means, to bring the disconnected end of said disconnected connecting section means in contact with the free end of the other of said base sections, an outward fold formed in said disconnected connecting section means adjacent the outward fold in said continuous connecting section, said outward fold being parallel to said inward fold, thus causing the intermediate portion of the disconnected connecting section means to fold between the said base sections, means attaching the free end of the disconnected connecting section means to the other of said base sections right side and left side tabs extending from each of the said base sections at substantially right angles to the two said connecting sections, the side tabs of a given base section being substantially mirror images of each other and each tab being individually shorter than one of the connecting sections, inward folds between the side tabs and the base sections to cause the tabs on each side of the base sections to overlap when folded and to cooperate to form a pair of collapsible walls between the base sections and extendable resilient means connected across said tabs to assist in stabilizing said tabs.

3. The viewer of claim 2 further characterized by cooperating notches formed in the right and left side tabs.

4. Apparatus comprising a first base section having a light receiving opening formed therein, a second base section arranged in parallel spaced apart relationship with said first base section, inwardly foldable continuous side wall sections connecting said first base section and said second base section on two opposite sides to close two of the side spaces between said first base section and said second base section, tabs extending from both free sides of said first base section and said second base section, the tabs of the respective sides of the said base sections cooperating to form a pair of opposing foldable tab walls, said tab walls being inwardly foldable when said first base section and said second base section are collapsed in closely spaced relationship, the said wall sections and the said tab walls cooperating to form a collapsible bellows means defining a view chamber with said base sections and resilient means connected interiorly of said view chamber and extending across said tab sections to assist in holding said first base section and said second base section in spaced apart relationship.

5. The apparatus of claim 4 further characterized by cooperating notches formed in said tabs.

6. A collapsible bellows for forming a view chamber for binoculars or the like comprising a pair of spaced apart base sections, each of said sections having at least one opening therein, a continuous connecting section joining the said base sections, parallel inward folds at the intersection of each base section and said continuous connecting section, said inward folds tending to bring said openings into registering alignment for viewing therethrough, a pair of outward folds in said continuous connecting section between said base sections, said outward folds being formed parallel to said inward folds in a manner which tends to fold the intermediate portion of said continuous connecting section between the said base sections, an inward fold having a slot formed over a portion of its length intermediate the said pair of outward folds, a pair of discontinuous connecting sections, one of said discontinuous connecting sections extending from each of the free ends of each of said base sections, said discontinuous connecting sections each comprising an intermediate base section and an intermediate connecting section, a view opening in each intermediate base section which permits light to register through the intermediate base sections when said intermediate base sections are positioned in back to back relationship, parallel inward folds at the intersection of each intermediate base section and each intermediate connecting section and its respective base section, an outward fold intermediate each intermediate connecting section, a tab on the free end of each intermediate base section, each of said tabs engageable in said slot, right side tabs and left side tabs extending from each of the said base sections and each of the intermediate base sections at substantially right angles to the connecting sections, the said side tabs of a given base section being individually shorter than the connecting section, the right side tabs and the left side tabs of opposing base sections being long enough so that their end portions overlap when folded and cooperate to form collapsible side walls between the base sections to complete a bellows forming a view chamber, inward folds between the side tabs and the base sections and extendible resilient means connected across each set of cooperating right and left side tabs to assist in maintaining the bellows selectively in extended operating postion or in collapsed storage position.

7. The bellows of claim 6 further characterized by cooperating notches formed in said right side and left side tabs.

8. A collapsible bellows for forming a view chamber for binoculars or the like comprising a pair of spaced apart base sections, each of said sections having at least one opening therein, a continuous connecting section joining the said base sections, parallel inward folds at the intersection of each base section and said continuous connecting section, said inward folds tending to bring said openings, into registering alignment for viewing therethrough, a pair of outward folds in said continuous connecting section between said base sections, said outward folds being formed parallel to said inward folds in a manner which tends to fold the intermediate portion of said continuous connecting section between the said base sections, a central inward fold intermediate the said pair of outward folds, a pair of discontinuous connecting sections, one of said discontinuous connecting sections extending from each of the free ends of each of said base sections, said discontinuous connecting sections each comprising an intermediate base section and an intermediate connecting section, a view opening in each intermediate base section which permits light to register through the intermediate base sections when said intermediate base sections are positioned in back to back relationship, parallel inward folds at the intersection of each intermediate base section and each intermediate connecting section and its respective base section, an outward fold intermediate each intermediate connecting section, means for connecting the free end of each intermediate base section to said central inward fold, right side tabs and left side tabs extending from each of the said base sections and each of the intermediate base sections at substantially right angles to the connecting sections, the said side tabs of a given base section being individually shorter than the connecting section, the right side tabs and the left side tabs of opposing base sections being long enough so that their end portions overlap when folded and cooperate to form collapsible side walls between the base sections to complete a bellows forming a view chamber, inward folds between the base sections to complete a bellows forming a view chamber, inward folds between the side tabs and the base sections and extendible resilient means connected across each set of cooperating right and left side tabs to assist in maintaining the bellows selectively in extended operating position or in collapsed storage position.

9. The bellows of claim 8 further characterized by cooperating notches formed in said right side and left side tabs.

10. A blank for forming a collapsible viewer comprising a pair of spaced apart base sections, each of said sections having an opening therein, a continuous connecting section connecting said base sections, parallel inward folds at the intersection of each base section and said continuous connecting section, said inward folds for bringing said openings into alignment for viewing therethrough, an outward fold in said continuous connecting section between said base sections, said outward fold being formed parallel to said inward folds for folding the intermediate portion of said continuous connecting section between the said base sections, a discontinuous connecting section means of approximately the same length as the said continuous connecting section unitarily formed with an extending from one of said base sections, an inward fold formed at the intersection of said one of said base sections and said discontinuous connecting section means for bringing the disconnected end of said disconnected connecting section means in contact with the free end of the other of said base sections, an outward fold formed in said disconnected connecting section means adjacent the outward fold in said continuous connecting section, said outward fold being parallel to said inward fold to permit the intermediate portion of the disconnected connecting section means to fold between the said base sections, right side and left side tabs extending from each of the said base sections at substantially right angles to the two said connecting sections, the side tabs of a given base section being substantially mirror images of each other and each tab being individually shorter than one of the connecting sections and inward folds between the side tabs and the base sections to allow the tabs on each side of the base sections to overlap when folded and to cooperate to form a pair of collapsible walls between the base sections.

11. A blank for forming collapsible bellows for a view chamber for binoculars or the like comprising a pair of spaced apart base sections, each of said sections having at least one opening therein, a continuous connecting section joining the said base sections, parallel inward folds at the intersection of each base section and said continuous connecting section, said inward folds for bringing said openings into registering alignment for viewing therethrough, a pair of outward folds in said continuous connecting section between said base sections, said outward folds being formed parallel to said inward folds for folding the intermediate portion of said continuous connecting section between the said base sections, an inward fold having a slot formed over a portion of its length intermediate the said pair of outward folds, a pair of discontinuous connecting sections, one of said discontinuous connecting sections extending form each of the free ends of each of said base sections, said discontinuous connecting sections each comprising an intermediate base section and an intermediate connecting section, a view opening in each intermediate base section which permits light to register through the intermediate base sections when said intermediate base sections are positioned in back to back relationship, parallel inward folds at the intersection of each intermediate base section and each intermediate connecting section and its respective base section, an outward fold intermediate each intermediate connecting section, a tab on the free end of each intermediate base section, each of said tabs engageable in said slot, right side tabs and left side tabs extending from each of the said base sections and each of the intermediate base sections at substantially right angles to the connecting sections, the said side tabs of a given base section being individually shorter than the connecting section, the right side tabs and the left side tabs of opposing base sections being long enough so that their end portions overlap when folded and cooperate to form collapsible side walls between the base sections to complete a bellows forming a view chamber and inward folds between the side tabs and the base sections.

12. A blank for forming collapsible bellows for a view chamber for binoculars or the like comprising a pair of spaced apart base sections, each of said sections having at least one opening therein, a continuous connecting section joining the said base sections, parallel inward folds at the intersection of each base section and said continuous connecting section, said inward folds for bringing said openings into registering alignment for viewing therethrough, a pair of outward folds in said continuous connecting section between said base sections, said outward folds being formed parallel to said inward folds for folding the intermediate portion of said continuous connecting section between the said base sections, a central inward fold intermediate the said pair of outward folds, a pair of discontinuous connecting sections, one of said discontinuous connecting sections extending from each of the fre ends of each of said base sections, said discontinuous connecting sections each comprising an intermediate base section and an intermediate connecting section, a view opening in each intermediate base section which permits light to register through the intermediate base sections when said intermediate base sections are positioned in back to back relationship, parallel inward folds at the intersection of each intermediate base section and each intermediate connecting section and its respective base section, an outward fold intermediate each intermediate connecting section, means for connecting the free end of each intermediate base section to said central inward fold, right side tabs and left side tabs extending from each of the said base sections and each of the intermediate base sections at substantially right angles to the connecting sections, the said side tabs of a given base section being individually shorter than the connecting section, the right side tabs and the left side tabs of opposing base sections being long enough so that their end portions overlap when folded and cooperate to form collapsible side walls between the base sections to complete a bellows forming a view chamber and inward folds between the side tabs and the base sections.

References Cited

UNITED STATES PATENTS

| | | | |
|---|---|---|---|
| 566,274 | 8/1896 | Moneyment | 350—70 |
| 2,715,853 | 8/1955 | Austin | 350—140 |
| 2,789,460 | 4/1957 | Kaufman | 40—63X(A) |
| 2,933,015 | 4/1960 | Somach | 40—64X(A) |
| 3,178,842 | 4/1965 | Zimmerman | 40—63X(A) |
| 3,386,194 | 6/1968 | Kaufman | 40—63(A) |
| 3,391,971 | 7/1968 | Kaufman | 350—140 |

ROBERT W. MITCHELL, Primary Examiner

R. CARTER, Assistant Examiner

U.S. Cl. X.R.

95—39; 350—140